United States Patent
Xing

(10) Patent No.: US 8,849,777 B1
(45) Date of Patent: Sep. 30, 2014

(54) FILE DELETION DETECTION IN KEY VALUE DATABASES FOR VIRTUAL BACKUPS

(75) Inventor: Jian Xing, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/251,189

(22) Filed: Sep. 30, 2011

Related U.S. Application Data

(63) Continuation-in-part of application No. 13/174,666, filed on Jun. 30, 2011.

(51) Int. Cl.
G06F 17/30 (2006.01)

(52) U.S. Cl.
USPC ............. 707/695; 707/640; 707/661

(58) Field of Classification Search
USPC ............. 707/695, 694, 687, 640, 661
See application file for complete search history.

(56) References Cited

U.S. PATENT DOCUMENTS

| | | | |
|---|---|---|---|
| 5,956,745 A | 9/1999 | Bradford et al. | |
| 6,560,615 B1 * | 5/2003 | Zayas et al. | 707/646 |
| 7,257,689 B1 | 8/2007 | Baird | |
| 7,596,713 B2 | 9/2009 | Mani-Meitav et al. | |
| 7,707,165 B1 * | 4/2010 | Jiang et al. | 707/806 |
| 7,890,469 B1 | 2/2011 | Maionchi et al. | |
| 8,055,614 B1 * | 11/2011 | Vaikar | 707/610 |
| 8,135,930 B1 | 3/2012 | Mattox et al. | |
| 8,171,063 B1 | 5/2012 | Janakiraman et al. | |
| 8,176,094 B2 | 5/2012 | Friedman | |
| 8,185,688 B2 | 5/2012 | Wan | |
| 8,200,637 B1 | 6/2012 | Stringham | |
| 8,346,727 B1 | 1/2013 | Chester et al. | |
| 8,386,733 B1 | 2/2013 | Tsaur et al. | |
| 8,495,741 B1 | 7/2013 | Nafter et al. | |
| 2002/0083053 A1 * | 6/2002 | Richard et al. | 707/3 |
| 2003/0097611 A1 * | 5/2003 | Delaney et al. | 714/13 |
| 2004/0172574 A1 | 9/2004 | Wing et al. | |
| 2004/0267822 A1 * | 12/2004 | Curran et al. | 707/200 |
| 2005/0278280 A1 | 12/2005 | Semerdzhiev et al. | |
| 2006/0259587 A1 | 11/2006 | Ackerman et al. | |
| 2008/0250474 A1 | 10/2008 | Bhogal et al. | |
| 2009/0094698 A1 * | 4/2009 | Nichols et al. | 726/24 |
| 2009/0222496 A1 | 9/2009 | Liu et al. | |
| 2010/0005259 A1 | 1/2010 | Prahlad et al. | |
| 2010/0070725 A1 | 3/2010 | Prahlad et al. | |
| 2010/0122248 A1 | 5/2010 | Robinson et al. | |
| 2010/0241654 A1 | 9/2010 | Wu et al. | |
| 2010/0257523 A1 | 10/2010 | Frank | |
| 2010/0262585 A1 | 10/2010 | Rosikiewicz et al. | |
| 2010/0325191 A1 | 12/2010 | Jung et al. | |

(Continued)

OTHER PUBLICATIONS

Berstein et al. (Microsoft Repository Version 2 and the Open Information Model, Information Systems, vol. 24, No. 2, pp. 71-98, 1999).

*Primary Examiner* — Shiow-Jy Fan
(74) *Attorney, Agent, or Firm* — Van Pelt, Yi & James LLP

(57) ABSTRACT

A method, article of manufacture, and apparatus for protecting data, comprising receiving a changed block, reading a previous backup to get a file list in change block tracking, checking a file in a modified master file table list for a reference flag, wherein the modified master file table list is based on the changed block, and modifying a database entry based on the reference flag.

14 Claims, 11 Drawing Sheets

(56) References Cited

U.S. PATENT DOCUMENTS

| | | |
|---|---|---|
| 2011/0035358 A1 | 2/2011 | Naik |
| 2011/0107025 A1 | 5/2011 | Urkude et al. |
| 2011/0113012 A1 | 5/2011 | Gruhl et al. |
| 2011/0161291 A1 | 6/2011 | Taleck et al. |
| 2011/0161295 A1 | 6/2011 | Ngo |
| 2011/0218967 A1 | 9/2011 | Sliger et al. |
| 2011/0252071 A1 | 10/2011 | Cidon |
| 2012/0011176 A1 | 1/2012 | Aizman |
| 2012/0016839 A1 | 1/2012 | Yueh |
| 2012/0084261 A1 | 4/2012 | Parab |
| 2012/0084414 A1 | 4/2012 | Brock et al. |
| 2012/0117342 A1 | 5/2012 | Karonde et al. |
| 2012/0304168 A1 | 11/2012 | Raj Seeniraj et al. |

\* cited by examiner

US 8,849,777 B1

FILE DELETION DETECTION IN KEY VALUE DATABASES FOR VIRTUAL BACKUPS

CROSS REFERENCE TO RELATED APPLICATIONS

This application is a continuation in part of claims priority to co-pending U.S. patent application Ser. No. 13/174,666 entitled EFFICIENT BACKUP OF VIRTUAL DATA filed on Jun. 30, 2011, which is incorporated herein by reference for all purposes. This application is related to co-pending U.S. patent application Ser. No. 13/174,675 entitled CHANGE TRACKING INDICES filed Jun. 30, 2011, which is incorporated herein by reference for all purposes, and to co-pending U.S. patent application Ser. No. 13/174,677 entitled VIRTUAL MACHINE FILE LEVEL RECOVERY filed Jun. 30, 2011, which is incorporated herein by reference for all purposes, and to co-pending U.S. patent application Ser. No. 13/174,681 entitled VIRTUAL MACHINE DISASTER RECOVERY filed Jun. 30, 2011, which is incorporated herein by reference for all purposes, and to co-pending U.S. patent application Ser. No. 13/251,184 entitled KEY VALUE DATABASES FOR VIRTUAL BACKUPS and filed concurrently herewith, which is incorporated herein by reference for all purposes, and to co-pending U.S. patent application Ser. No. 13/251,186 entitled UPDATING KEY VALUE DATABASES FOR VIRTUAL BACKUPS and filed concurrently herewith, which is incorporated herein by reference for all purposes, and to co-pending U.S. patent application Ser. No. 13/251,188 entitled EFFICIENT FILE BROWSING USING KEY VALUE DATABASES FOR VIRTUAL BACKUPS and filed concurrently herewith, which is incorporated herein by reference for all purposes.

FIELD OF THE INVENTION

This invention relates generally to processing data, and more particularly to systems and methods for protecting data.

BACKGROUND OF THE INVENTION

Virtualized computing environments are becoming increasingly popular due to their efficient use of hardware, ease of IT-management, and reduced operating costs. As with physical computing environments, data in virtualized computing environments also needs to be protected.

Protecting data in virtualized computing environments presents challenges that are not encountered in physical computing environments. Conventional methods to protect data in virtual environments typically include taking an image of a virtual disk and storing the image in a remote location.

However, such methods may take considerable time and resources to complete. As the amount of data that needs to be backed up or restored increases, the problem of efficiently protecting data is becoming more profound.

There is a need, therefore, for an improved method, article of manufacture, and apparatus for protecting data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
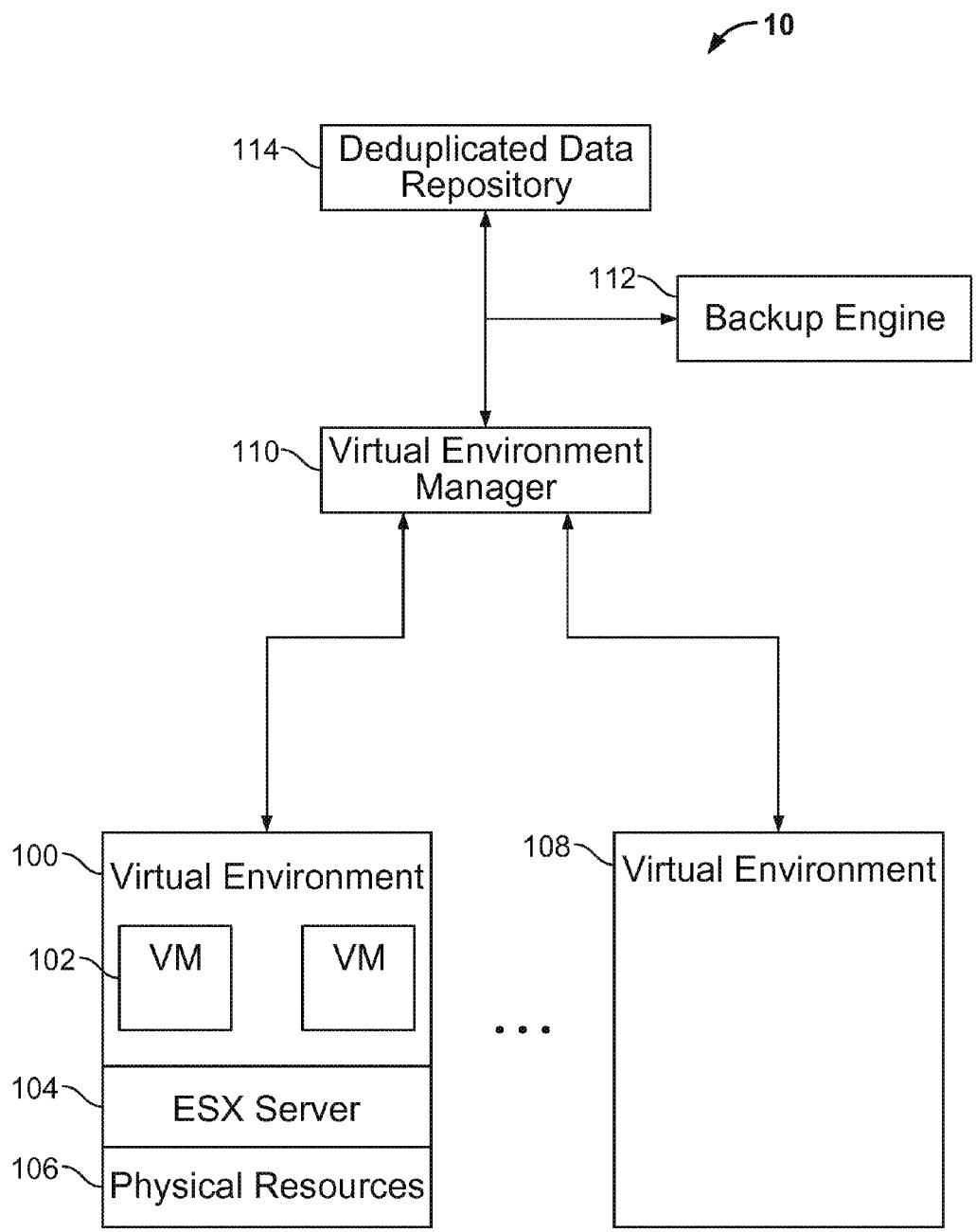
FIG. 1 illustrates a data system in accordance with some embodiments.

FIG. 1 illustrates a data system in accordance with some embodiments. Data system 10 may include one or more virtual environments, as illustrated by Virtual Environments 100 and 108. In some embodiments, Virtual Environment 100 may be a vSphere environment, a product offered by VMWare. A virtual environment may include one or more virtual machines (VMs) as illustrated by VMs 102. A virtual environment may also include an ESX server, a product offered by VMWare. A virtual environment also includes Physical Resources 106. Physical Resources 106 may be local hard disks or remote resources, such as storage area networks (SAN) or use a Network File System (NFS) protocol. VMs 102 may be different operating environments. For example, in some embodiments, VM 102 may be a virtual Windows machine. In some embodiments, VM 102 may be a virtual Linux machine. Virtual Environment Manager 110 manages one or more virtual environments. In some embodiments, a virtual environment maanger may be vCenter, a product offered by VMWare. Data from a virtual environment, or a VM, may be backed up to Deduplicated Data Repository 114. In some embodiments, Data Domain back products, offered by EMC Corporation, may be used. Backup Engine 112 may be an application to perform or orchestrate backup operations from the virtual environments to the deduplicated data repository. In some embodiments, Backup Engine 112 may be Networker, a product offered by EMC Corporation.

It should be noted that although FIG. 1 illustrates a certain configuration of data system 10, other configurations are possible. For example, one of the physical resources of a virtual environment may be a deduplicated data repository. This may be helpful in cases of disaster recovery, as explained herein. In other words, Physical Resources 106 may be Deduplicated Data Repository 114.

By utilizing a virtual environment manager and a deduplicated data repository, backing up image of virtual images may be made more efficient. Virtual environment managers, such as vCenter, may take snapshots of VMs under their supervision. In some embodiments, these are Virtual Machine Disk (VMDK) files. Once the snapshot has been created, a backup engine may begin moving the snapshot to the deduplicated data repository. Due to the nature of the deduplicated data repository, redundant blocks of data do not need to be transmitted. For example, certain VMWare configuration files, such as .vmx files, rarely change in between backups. Since this data is usually the same, there is no need to re-transmit the data on subsequent backups, such as incremental backups. Further, since the virtual environment manager created a snapshot of a VM, the backed up image may also be used to start a VM directly. In other words, the deduplicated data repository contains a workable VM. In some embodiments, the backup engine may connect directly to the ESX server to receive VMDK files and other data required for a backup.

The deduplicated data repository and virtual environment manager also allow for efficient incremental backups. In addition to not transmitting redundant data on subsequent backups, the incremental backup may be treated as a whole image, as opposed to only a delta with conventional techniques. Virtual environment managers may keep track of which blocks, or data, changed during a time period. In some embodiments, this may be vCenter's Change Block Tracking (CBT) feature. Using this information, a backup engine may only transmit the changed blocks. However, instead of just storing the changed blocks, the features of a deduplicated data repository may be utilized.

Deduplicated data repositories may replicate data efficiently. Since replicated data is by definition redundant data, pointers to the same block(s) of data are created. Thus, whether a deduplicated data repository holds one copy of data, two copies of data, or twenty copies of data, the amount actually stored is almost the same (save the space required for pointers, and other overhead, etc.). Further, since these "duplicate" copies of data are small, it is relatively fast to generate them (as compared to copying data). This is especially true when the data set is large. For example, it may take little time to create pointers to a set of data that is 100 GB large, but it will take a considerable amount of time and computing resources to create an actual copy of that 100 GB data. In some embodiments, Data Domain Boost, a product offered by EMC Corporation, may be used to efficiently replicate data in a deduplicated data repository.

Thus, instead of just storing the changed blocks in the deduplicated data repository, a replicate data set can be created, and the changed blocks can be written to the replicate data set. This results in an independent full image, not just a delta. Further, the original data set stored in the deduplicated data repository (e.g the original the replica was based off of) has not been modified, and may still be used for recovery processes.

Figure 4:
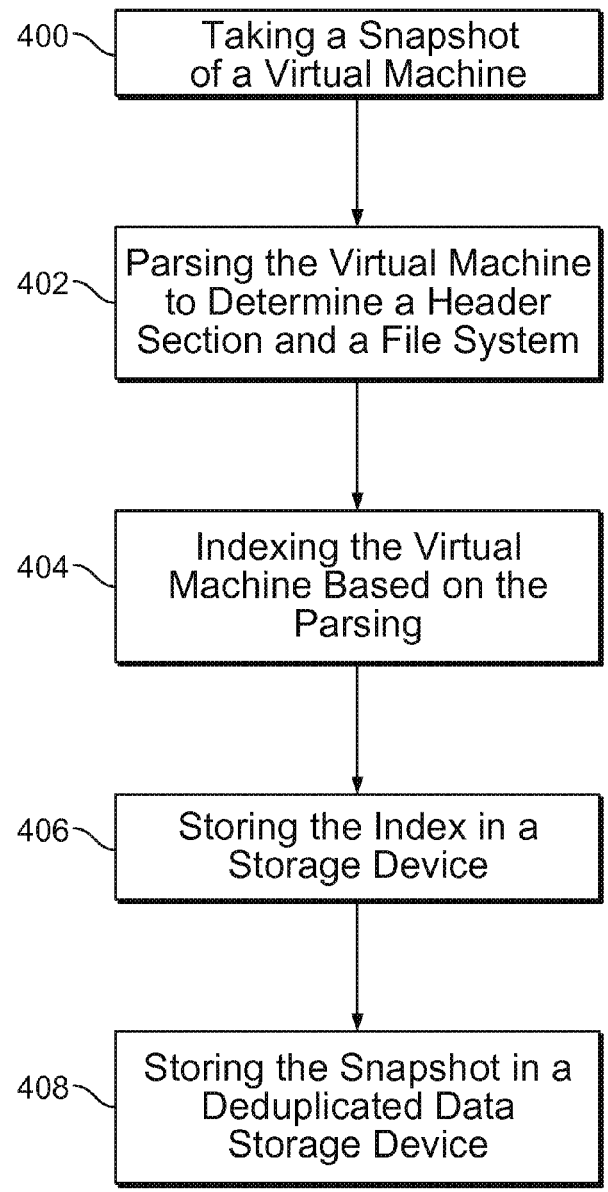
FIG. 4 illustrates a method to protect data in accordance with some embodiments.

FIG. 4 illustrates a method to protect data in accordance with some embodiments. In step 400, a snapshot of a virtual machine is taken. In step 402, the virtual machine is parsed to determine a header section and a file system. In step 404, the virtual machine is indexed based on the parsing. In step 406, the index is stored in a storage device. In step 408, the snapshot is stored in a deduplicated data storage device.

A VM may typically include several VMDK files. Once a VM or VMDK has been backed up to a deduplicated data repository, a user may want to retrieve one or more individual files from the backup. Typically, this has been accomplished by mounting the image, and browsing it as a local file system for the particular files(s). However, this may be an inefficient way of recovering individual files. For example, if a VMDK file 10 GB large, but a user only wanted a 1 KB file from it, mounting the entire VMDK would be a waste resources. Further, the user would have to wait for a 10 GB image to mount before being able to brose for the 1 KB file.

Figure 2:
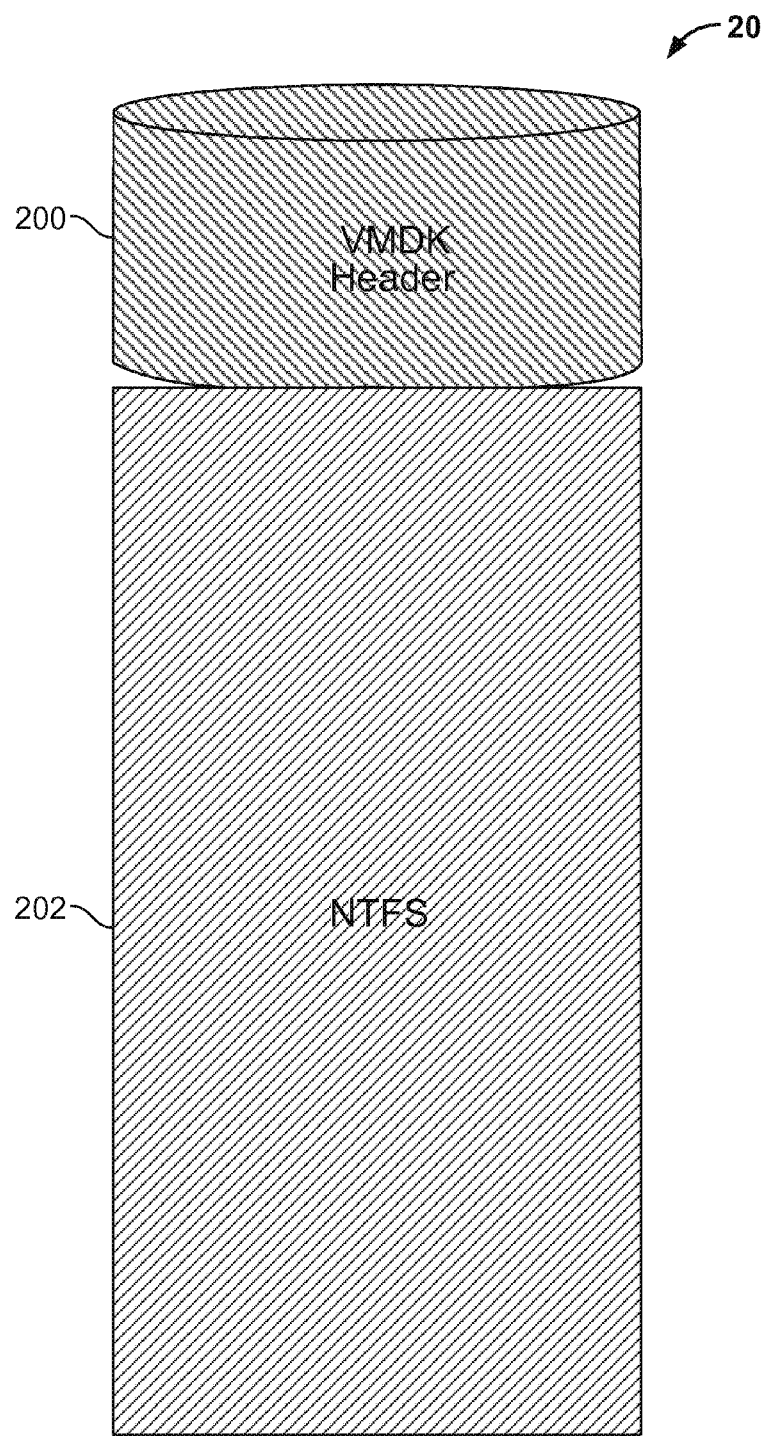
FIG. 2 illustrates a sample VMDK with a Windows file system.

Instead of mounting the VMDK, the enhanced techniques described herein parse a VMDK to index files in it. A VMDK can be broken down to two sections: A VMDK header, and a file system. The file system has the same layout as a normal file system under the native operating system. For example, if a VMDK included a Windows XP operating system, the file system would be same as a normal Windows XP operating system (e.g. NTFS file system). FIG. 2 illustrates a sample VMDK with a Windows file system. VMDK 20 includes two regions: the top is VMDK Header 200. The larger bottom is NTFS File System 202.

Since a VMDK header is well defined, it is possible to skip over the VMDK header and go straight to the file system. If the file system is a NTFS file system, the Master File Table (MFT) can be parsed to identify every file in the NTFS file system. In some embodiments, this includes reading the MFT and getting file attributes, and for non-resident files, getting an extent list. Resident files are files that reside in the MFT. Non-resident files are files that reside outside the MFT.

In some embodiments, a backup engine parses the full MFT, processes each file record in the table, and saves the file information in its database or index. When parsing the MFT, the backup engine saves the following information for each file record: File type (e.g. resident vs. non-resident), file record number (used to access the data for a resident file), time stamp, size of file, and a file extent list (used to access the data for non-resident files). In some embodiments, the index may be saved in the deduplicated data repository. In some embodiments, the index may be saved on the VM for ease of access. In some embodiments, the index may be stored locally to the backup engine. By pre-indexing the files during a backup process, a user will be able to identify individual files after the backup engine has completed the backup process. Thus, when a user wants to recover an individual file, a backup or recovery engine does not need to mount the entire VMDK to find the file. Rather, the index may be used to locate where in the VMDK the individual file resides. Since the deduplicated data repository has a full image of a VMDK file, the backup may also be parsed based on the information in the index (e.g. whether the individual file is a resident or nonresident file, and where in the file system the file is, etc.). In some embodiments, after isolating the part of the VMDK the individual file resides in, the backup or recovery engine may reconstruct the file on the deduplicated data repository, or may push it to an ESX server or individual VMs.

Figure 6:
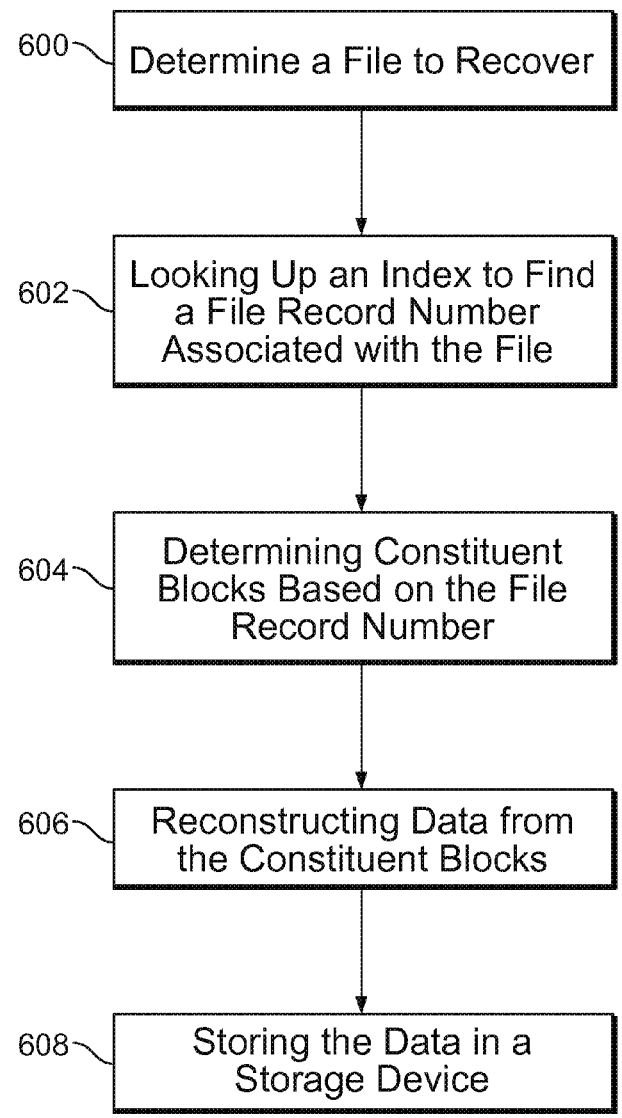
FIG. 6 illustrates a method to protect data in accordance with some embodiments.

FIG. 6 illustrates a method to protect data in accordance with some embodiments. In step 600, a file to recover is determined. In step 602, an index is looked up to find a file record number associated with the file. In step 604, constituent blocks are determined based on the file record number. In step 606, data is reconstructed from the constituent blocks. In step 608, the data is stored in a storage device. In some embodiments, the constituent blocks may be a subset of a VMDK image. In other words, the file to recover is stored as part of a VMDK image.

In some embodiments, if a user wanted to recover multiple resident files, it may be preferable to recover the whole MFT in memory and then recover each file based on file record number. If a user wanted to recover non-resident files, the backup engine may recover the file data extent list to determine where in the VMDK the files are, and use the deduplicated data repository's replication ability to quickly recover the file.

In some embodiments, it may not be preferable to parse the entire MFT. For example, when processing an incremental backup, it may be determined that very little data has changed (e.g. CBT identifies only a few changed blocks). However, the actually data set may be very large and contain a large number of files. Accordingly, the MFT may also be very large. It may be inefficient to parse the entire MFT when it can be inferred that only a few files have changed based on the CBT. Using the enhanced techniques described herein, it may be preferable to parse only the section of the MFT that changed.

Figure 3:
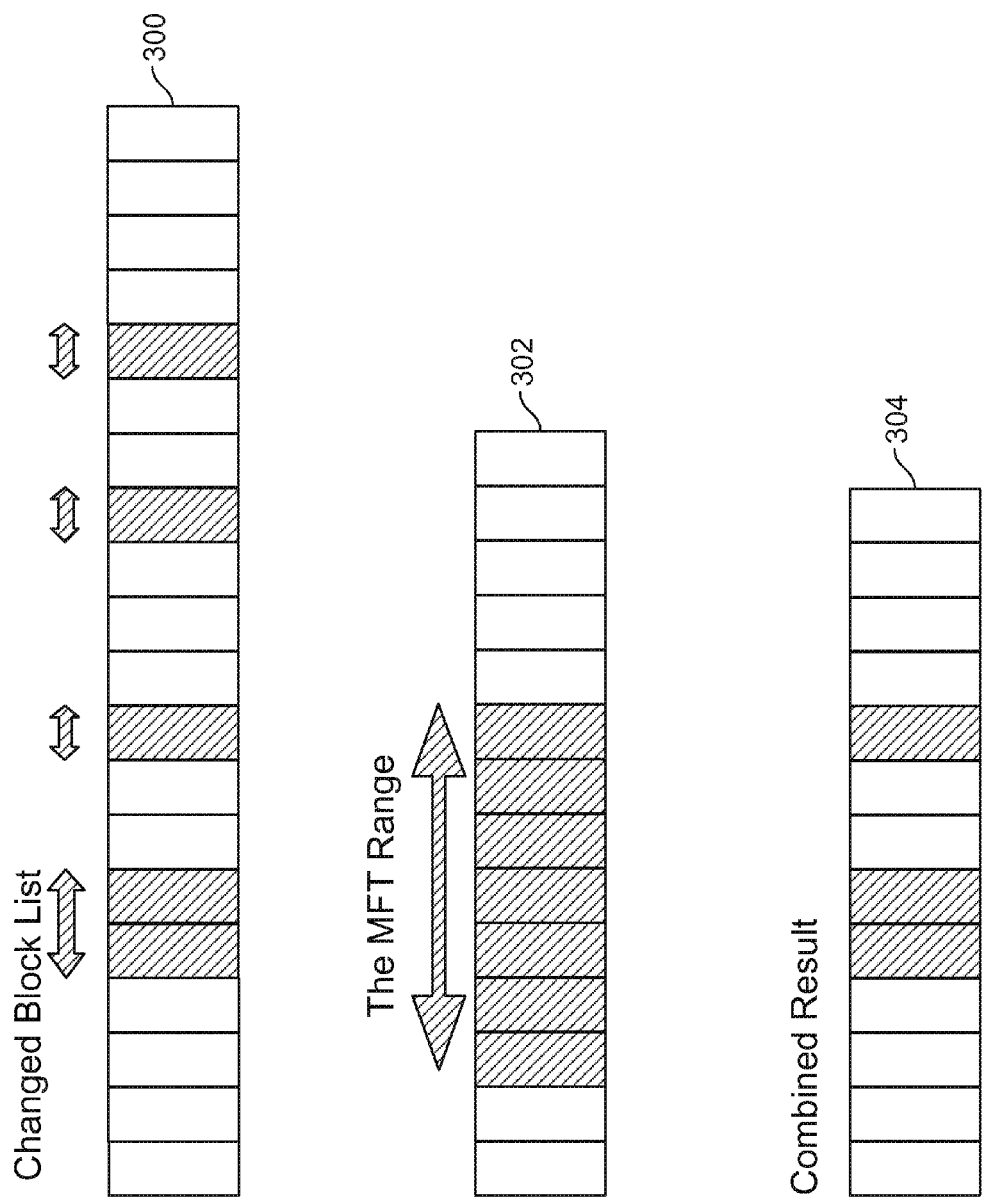
FIG. 3 illustrates three different views of a VMDK in accordance with some embodiments.

FIG. 3 illustrates three different views of a VMDK in accordance with some embodiments. VMDK View 300 shows a changed block list. The green blocks illustrate which blocks have changed. The white blocks illustrate blocks that have not changed. VMDK View 302 shows where in the VMDK the MFT resides. The range of the MFT may be determined by parsing the VMDK from its previous full backup to determine the start location, and an end location may be calculated based on the number of file records. Since the range of the MFT is known, and the changed block list is known (may be from vCenter), we can combine the two to determine which blocks in the MFT changed. This is illustrated by the red blocks in VMDK 304. Thus, during incremental backups, only the changed section of the MFT needs to be parsed. The changes may be detected and written to the index. The new index may be saved as a separate whole index (e.g not just a delta), or may overwrite the old index. This may result in considerable time and resource savings if the MFT is very large and the change is very small.

Figure 5:
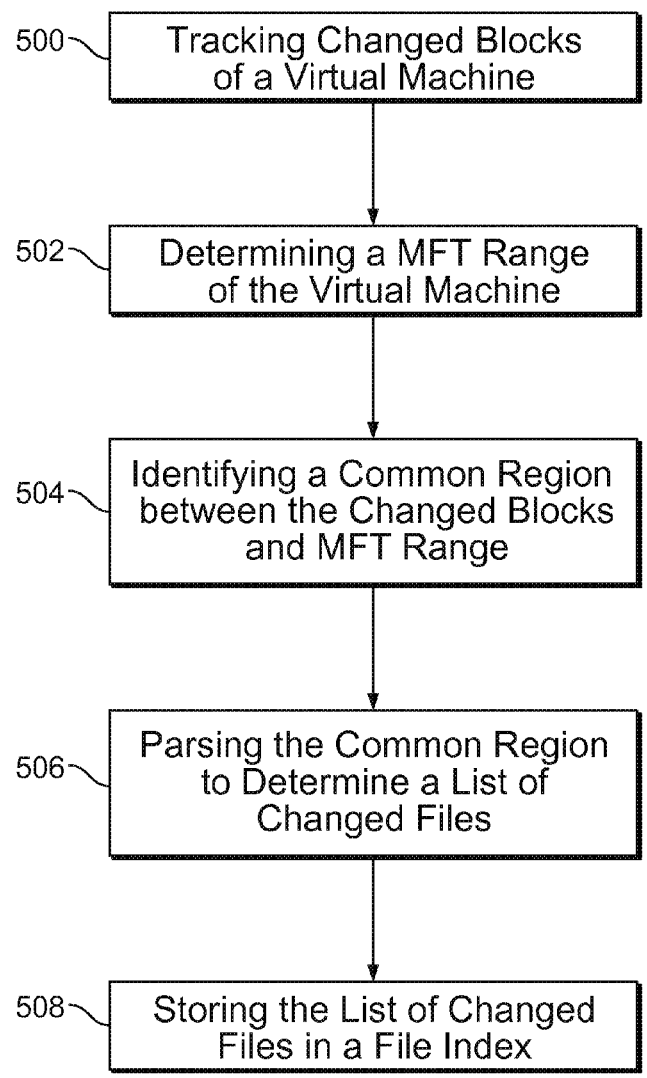
FIG. 5 illustrates a method to protect data in accordance with some embodiments.

FIG. 5 illustrates a method to protect data in accordance with some embodiments. In step 500, changed blocks of a virtual machine are tracked. In step 502, a MFT range of the virtual machine is determined. In step 504, a common region between the changed blocks and MFT range is identified. In step 506, the common region is parsed to determine a list of changed files. In step 508, the list of changed files is stored in an index. In some embodiments, the index may include a list of files of the virtual machine in a previous state (e.g. an earlier version of the backup).

In some embodiments, the deduplicated data repository is disk based. A disk may be preferable to tape in some embodiments, such as in the case of disaster recovery. For example, suppose a VM in a vSphere went down. Assuming the VM had been backed up to the disk based deduplicated data repository, a user may configure the ESX server via NFS to enable ESX access to all data on the repository. In other words, the storage in FIG. 1 may be configured to include the repository. Since the repository has both the configuration files and VMDK files saved with the original format during the backup, and each backup is an independent full backup, these backups may be registered with the virtual environment manager (or vCenter) to start a VM immediately on the repository.

Further, if a user did not wish to alter the original backup by performing operations on it, the replication features of the repository may be used to create a copy of the full backup. The copy may then be used to start the VM instead of the original, and all changes made during the operation of the VM will be made to the copy. The user may keep, delete, or migrate the new VM as needed after the VM has been registered with the virtual environment manager (vCenter).

Figure 7:
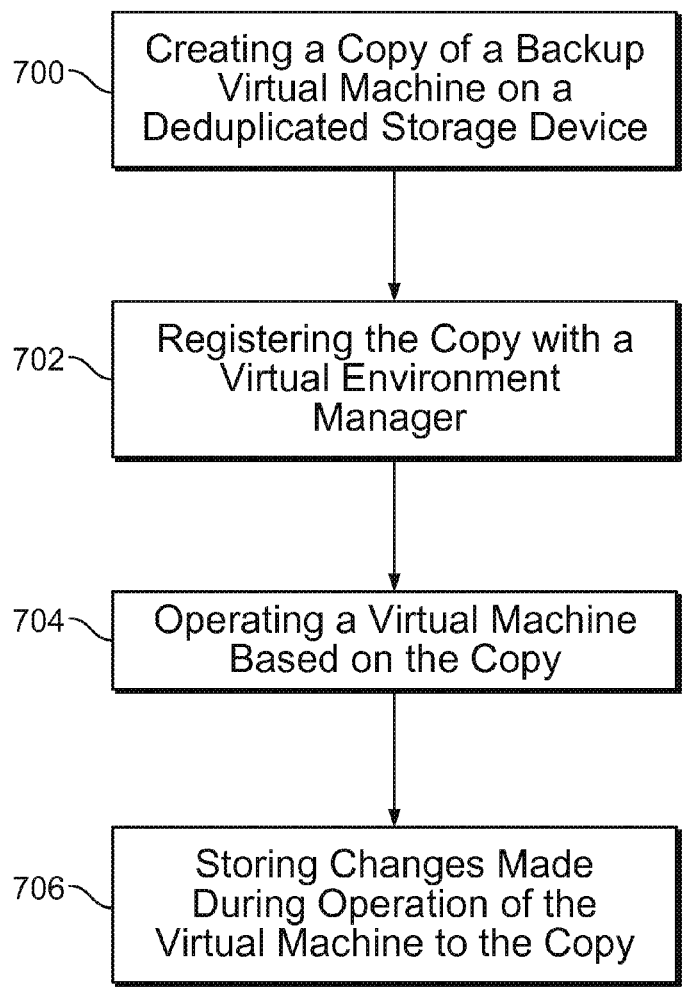
FIG. 7 illustrates a method to protect data in accordance with some embodiments.

FIG. 7 illustrates a method to protect data in accordance with some embodiments. In step 700, a copy of a backup virtual machine is created on a deduplicated data storage device. In step 702, the copy is registered with a virtual environment manager. In some embodiments, the virtual environment manager may be vCenter. In step 704, a virtual machine is operated based on the copy. In step 706, the changes made during operation of the virtual machine are stored to the copy. In some embodiments, operating the virtual machine includes connecting an ESX server to the deduplicated data storage device.

In some embodiments, a database may be created for a virtual backup. The database may be used to assist in keeping track of files in the backup. Suppose a file system has the following structure:

/(root) C:\ Dir1\ File 1, File 2
Dir2\
D:\ Dir 1 File 1

File 1 and File 2 are in the path /C:\Dir1. There is nothing in /C:\Dir2\, and there is only File 1 in /D:\Dir1. In some embodiments, a key/value database is used. In the above example, a key/value database may look like:

| Key | Value |
| --- | --- |
| / | C |
| / | D |
| C:\ | Dir1 | Version Info |
| C:\ | Dir2 | Version Info |
| C:\Dir1 | File 1 | Version Info | Timestamp | Size |
| C:\Dir2 | File 2 | Version Info | Timestamp | Size |
| D:\ | Dir1 | Version Info |
| D:\Dir1 | File1 | Version Info | Timestamp | Size |

The "Value" may also include other file attribute information, such as reference flag, data block information (e.g. start block number, total number of blocks in the file, etc.), access control, and resident/non-resident file flag, among others.

Figure 8:
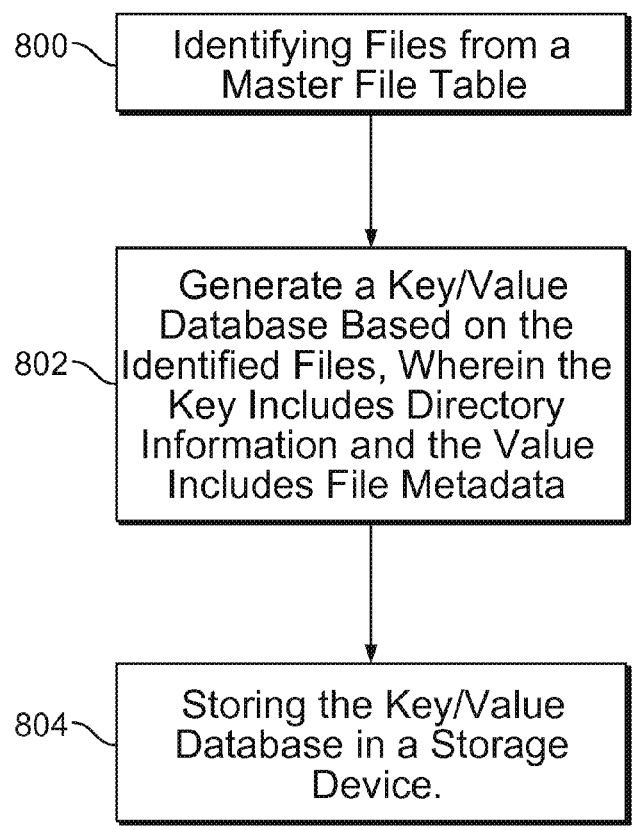
FIG. 8 illustrates a method to protect data in accordance with some embodiments.

FIG. 8 illustrates a method to protect data in accordance with some embodiments. In step 800, files are identified from a master file table. In step 802, a key/value database is generated based on the identified files, wherein the key includes directory information and the value includes file metadata. In step 804, the key/value database is stored in a storage device.

Version info includes information on the freshness of a file. For example, suppose during a full virtual backup, the file CONFIG.SYS was backed up. An entry in the database may look like:

CONFIG.SYS |1|0|t1|{other metadata}

This entry indicates that CONFIG.SYS backed up at time t1 has a start version 1 and an end version 0. In some embodiments, an end version 0 indicates that this entry is the current version. Other numbers or indicators may be used to indicate a current version. Thus, this CONFIG.SYS is current.

Suppose another backup occurred at time t2, and CONFIG.SYS was not changed. Since CONFIG.SYS was not changed, the database would not need to be modified. However, if CONFIG.SYS was changed, the database would need to be updated. A database may look like the following in some embodiments:

CONFIG.SYS |1|1|t1|{other metadata}
CONFIG.SYS |2|0|t2|{other metadata}

There are now two entries for CONFIG.SYS in the database. The first entry indicates that at time t1, a version of CONFIG.SYS was backed up, but it is only valid for that version (e.g. obsolete). That is, the start version and the end versions are both the same (1). The second entry indicates that at time t2, a version of CONFIG.SYS was backed up, and that this second version is the current version (start version=2, end version=0). If a user was looking to restore CONFIG.SYS and saw this database, the user would be able to see that the second CONFIG.SYS is the current version and most likely would choose to restore this version. However, in some embodiments, the user may decide to restore an earlier version (e.g. current version may have been infected with a virus, etc.).

Figure 9:
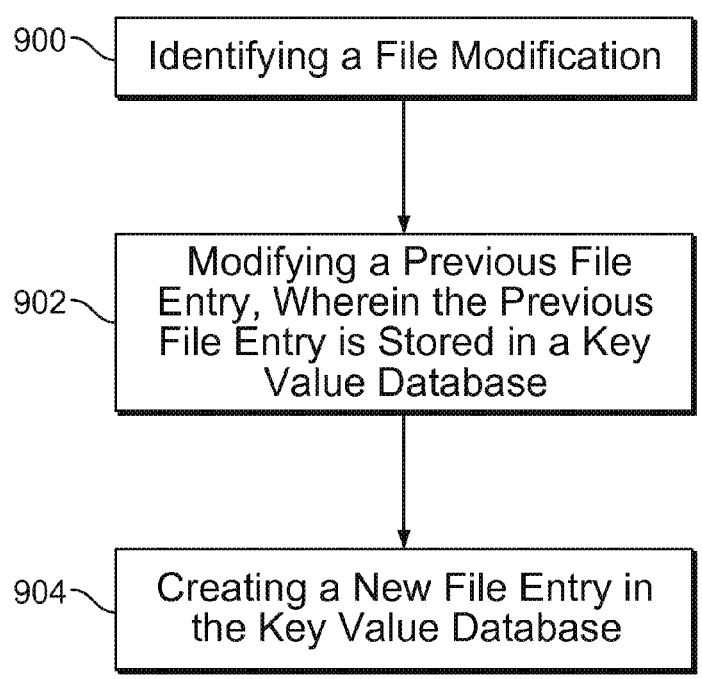
FIG. 9 illustrates a method to protect data in accordance with some embodiments.

FIG. 9 illustrates a method to protect data in accordance with some embodiments. In step 900, a file modification is identified. In step 902, a previous file entry is modified, wherein the file entry is stored in a key value database. In step 904, a new file entry is created in the key value database.

To determine if a file changed, change block tracking (CBT) as described herein may be used. However, a file does not typically correlate 1:1 to a block. Typically, a block may be used by several files. For example, in some embodiments, the minimum CBT block size is 64k, and MTF entries are 1k each. Thus, a single block may potentially be used by 64 different files. If only one file is actually changed, the other 63 files may be considered candidates for "modified files" since CBT only keeps track of changes on the block level, and the block, as a whole, has changed due to the one modified file.

In order to keep the database accurate (e.g. not report 63 modified files when they are not actually modified), the timestamps may be compared. Using the above example, suppose at t2, the second backup's CBT indicated that CONFIG.SYS may have been modified. If the second CONFIG.SYS's timestamp was the same as the first CONFIG.SYS's timestamp, then CONFIG.SYS did not change between the two backups, and its database entry may be updated to reflect the "changed block." The following data entry illustrates how an entry may be updated in accordance with some embodiments.

Old record: (start version 1)
CONFIG.SYS|Reference Flag 1|1|0|t1|{other metadata}
Update the record (change reference flag to latest version)
CONFIG.SYS|Reference Flag 2|1|0|t1|{other metadata}

Note how there is no new record. This is unlike the case where a file is modified, which requires updating the old record and creating a new record. In this case, the old record is modified to update a reference flag, but the start version (1), end version (0), and timestamp (t1) remain the same. Thus, when a user chooses to restore CONFIG.SYS, the user will still only see one entry for CONFIG.SYS in the database, and it will be the start version 1 CONFIG.SYS.

When a file is added after a backup, the MFT will change and the CBT will notice this change. The file will be compared against the database, which currently does not have an entry for the file, and added to the database. Using the above example, suppose NEW_CONFIG.SYS was created after t1 but before t2. At time t2, when the second backup commences, the CBT will indicate a change in a MFT block. One of the files in the changed MFT block is NEW_CONFIG.SYS. Since the database does not have any entry for this file, a new entry will be created. In some embodiments, the entry may be:

NEW_CONFIG.SYS|Reference Flag 2|2|1|t2|{other metadata}

Thus, NEW_CONFIG.SYS is current (end version 0), has a timestamp of time t2, and its start version is 2.

Deleting a file will also affect the MFT and the CBT will notice this change. However, since the MFT no longer has a record of the deleted file, there will be no indication of this file during a subsequent backup. As discussed above, a "no indication" may mean that a file has not changed since the last backup (e.g. CBT did not detect a change, thus MFT did not show a changed file). In order to detect a deleted file, the previous backup is read to get the file list in CBT. Each file in the modified MFT list is checked for its reference flag. If the reference flag is set to the current version, then the file is present (e.g. not deleted). If the reference flag is not set, then there is no reference in the current backup and the file is not present (e.g. deleted). After determining a file has been deleted, its database entry would need to be modified. Using the example above, suppose NEW_CONFIG.SYS was deleted at time t3.

NEW_CONFIG.SYS|Reference Flag 3|2|2|t2|{other metadata}

Thus, NEW_CONFIG.SYS had a start version of 2 and an end version of 2. Note how there is no new entry in the database—only a modification of a past entry to indicate that the file is no longer current.

Figure 10:
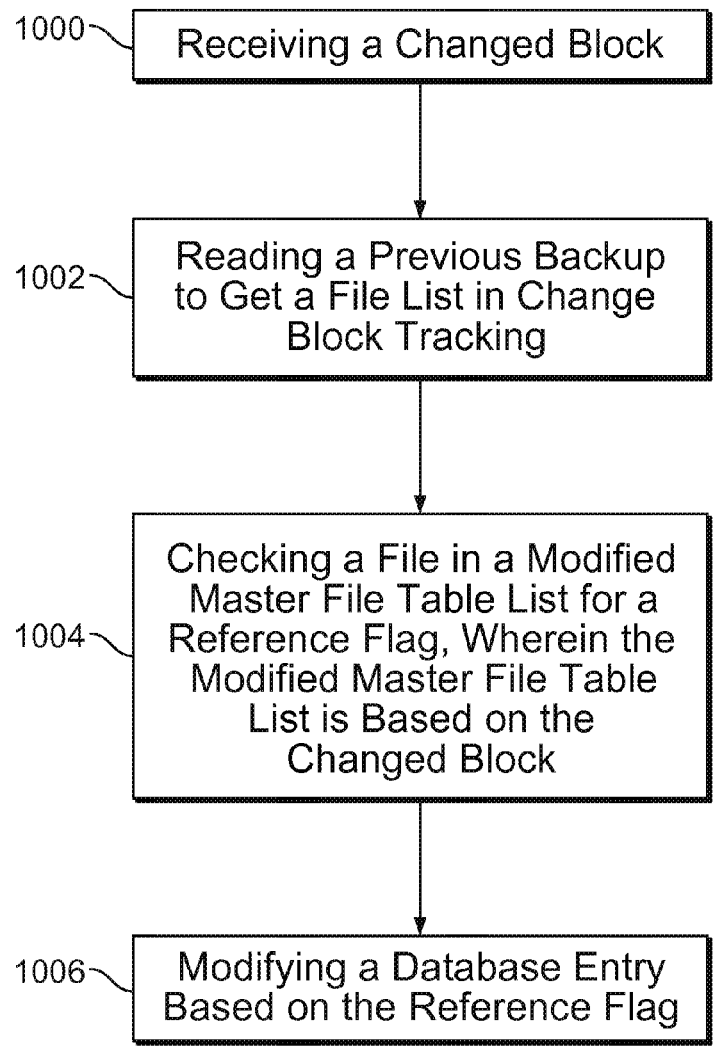
FIG. 10 illustrates a method to protect data in accordance with some embodiments.

FIG. 10 illustrates a method to protect data in accordance with some embodiments. In step 1000, a changed block is received. In step 1002, a previous backup is read to get a file list in change block tracking. In step 1004, a file in a modified master file table list is checked for a reference flag, wherein the modified master file table list is based on the changed block. In step 1006, a database entry is modified based on the reference flag.

Figure 11:
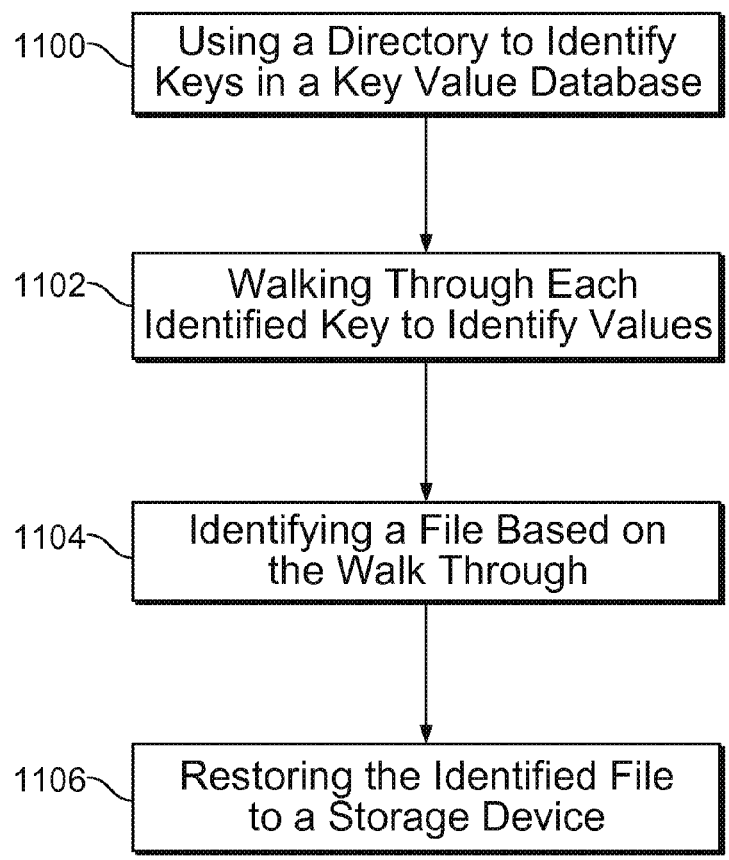
FIG. 11 illustrates a method to protect data in accordance with some embodiments.

FIG. 11 illustrates a method to protect data in accordance with some embodiments. In step 1101, a directory is used to identify keys in a key value database. In step 1102, each key is walked through to identify values. In step 1104, a file is identified based on the walk through. In step 1106, the identified file is restored to a storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for protecting data, the method comprising:
receiving a first changed block corresponding to a section of a Master File Table ("MFT") that has changed since a previous backup, wherein the first changed block is associated with a plurality of files in the MFT;
updating, in response to receiving the first changed block, a backup database associated with the MFT, wherein the backup database comprises one or more entries that each comprise a reference flag and a timestamp, and wherein updating the backup database includes:
determining whether the first changed block comprises one or more new files that have been added to the MFT since the previous backup, wherein a new backup database entry is created in the event that a file in the first changed block does not correspond to any existing backup database entries, and wherein the new backup database entry comprises a reference flag set to a current backup version;
determining whether the first changed block comprises one or more files in the MFT that have been modified since the previous backup including by setting to the current backup version: (1) a reference flag that is associated with a backup database entry for each of the plurality of files comprising the first changed block, and (2) a reference flag that is associated with each new backup database entry for one or more files that are determined to have been modified;
determining whether the first changed block comprises one or more files in the MFT that have been deleted since the previous backup at least in part by reading the previous backup to determine a list of files associated with the first changed block at a time of the previous backup;
for a first file in the list of files associated with the first changed block:
identifying a backup database entry associated with the first file;
determining whether the reference flag is set to the current backup version; and
in the event that the reference flag is not set to the current backup version, modifying the backup database entry associated with the first file indicating that the first file has been deleted since the previous backup.

2. The method as recited in claim 1, wherein the backup database entry comprises an end version and modifying the backup database entry includes modifying the end version of the backup database entry to a value indicating that the file has been deleted.

3. The method as recited in claim 1, wherein the backup database is generated by identifying files from the MFT and wherein each of at least some entries in the backup database correspond to a file in the MFT.

4. The method as recited in claim 1, wherein determining whether the first changed block comprises one or more new files that have been added to the MFT since the previous backup includes identifying, for each of at least some of the files in first changed block, an existing backup data base entry that corresponds to the file.

5. The method as recited in claim 1, determining whether the first changed block comprises one or more files in the MFT have been modified since the previous backup includes determining whether each of at least some of the files in the first changed block have been modified based at least in part on a timestamp associated with the file.

6. The method as recited in claim 5, wherein in the event that a file has been modified since the previous backup:
updating a previous backup database entry associated with a previous version of the file to indicate that the previous version of the file is obsolete; and
creating a new backup database entry associated with the modified version of the file, wherein the new backup database entry comprises a timestamp that corresponds to a time of the current backup.

7. The method as recited in claim 1, wherein setting to the current backup version a reference flag that is associated with a backup database entry for each of the plurality of files comprising the first changed block includes setting one or more reference flags associated with backup database entries for files that are determined to have not been modified since the previous backup.

8. A system for protecting data, comprising a storage device and a processor configured to:
receive a first changed block corresponding to a section of a Master File Table ("MFT") that has changed since a previous backup, wherein the first changed block is associated with a plurality of files in the MFT;
update, in response to receiving the first changed block, a backup database associated with the MFT, wherein the backup database comprises one or more entries that each comprise a reference flag and a timestamp, and wherein updating the backup database includes:
determining whether the first changed block comprises one or more new files that have been added to the MFT since the previous backup, wherein a new backup database entry is created in the event that a file in the first changed block does not correspond to any existing backup database entries, and wherein the new backup database entry comprises a reference flag set to a current backup version;
determining whether the first changed block comprises one or more files in the MFT that have been modified since the previous backup including by setting to the current backup version: (1) a reference flag that is associated with a backup database entry for each of the plurality of files comprising the first changed block, and (2) a reference flag that is associated with each new backup database entry for one or more files that are determined to have been modified;

determining whether the first changed block comprises one or more files in the MFT that have been deleted since the previous backup at least in part by reading the previous backup to determine a list of files associated with the first changed block at a time of the previous backup;

for a first file in the list of files associated with the first changed block:

identifying a backup database entry associated with the first file, wherein the backup database entry comprises a reference flag and a timestamp;

determining whether the reference flag is set to a current backup version; and in the event that the reference flag is not set to the current backup version, modifying the backup database entry associated with the first file indicating that the first file has been deleted since the previous backup.

9. The system as recited in claim 8, wherein the backup database is generated by identifying files from the MFT and wherein at least some entries in the backup database correspond to files in the MFT.

10. The system as recited in claim 8, wherein determining whether the first changed block comprises one or more new files that have been added to the MFT since the previous backup includes identifying, for each of at least some of the files in first changed block, an existing backup data base entry that corresponds to the file.

11. The system as recited in claim 8, determining whether the first changed block comprises one or more files in the MFT have been modified since the previous backup includes determining whether each of at least some of the files in the first changed block have been modified based at least in part on a timestamp associated with the file.

12. The system as recited in claim 11, wherein in the event that a file has been modified since the previous backup:

updating a previous backup database entry associated with a previous version of the file to indicate that the previous version of the file is obsolete; and creating a new backup database entry associated with the modified version of the file, wherein the new backup database entry comprises a timestamp that corresponds to a time of the current backup.

13. The system as recited in claim 8, wherein setting to the current backup version a reference flag that is associated with a backup database entry for each of the plurality of files comprising the first changed block includes setting one or more reference flags associated with backup database entries for files that are determined to have not been modified since the previous backup.

14. A computer program product for protecting data, comprising a non-transitory computer readable medium having program instructions embodied therein comprising:

receiving a first changed block corresponding to a section of a Master File Table ("MFT") that has changed since a previous backup, wherein the first changed block is associated with a plurality of files in the MFT;

updating, in response to receiving the first changed block, a backup database associated with the MFT, wherein the backup database comprises one or more entries that each comprise a reference flag and a timestamp, and wherein updating the backup database includes:

determining whether the first changed block comprises one or more new files that have been added to the MFT since the previous backup, wherein a new backup database entry is created in the event that a file in the first changed block does not correspond to any existing backup database entries, and wherein the new backup database entry comprises a reference flag set to a current backup version;

determining whether the first changed block comprises one or more files in the MFT that have been modified since the previous backup including by setting to the current backup version: (1) a reference flag that is associated with a backup database entry for each of the plurality of files comprising the first changed block, and (2) a reference flag that is associated with each new backup database entry for one or more files that are determined to have been modified;

determining whether the first changed block comprises one or more files in the MFT that have been deleted since the previous backup at least in part by reading the previous backup to determine a list of files associated with the first changed block at a time of the previous backup;

for a first file in the list of files associated with the first changed block:

identifying a backup database entry associated with the first file, wherein the backup database entry comprises a reference flag and a timestamp;

determining whether the reference flag is set to a current backup version; and in the event that the reference flag is not set to the current backup version, modifying the backup database entry associated with the first file indicating that the first file has been deleted since the previous backup.

* * * * *